United States Patent [19]  
Murley

[11] Patent Number: 4,527,970  
[45] Date of Patent: Jul. 9, 1985

[54] APPARATUS FOR INJECTION MOLDING POLYMERIC ARTICLES

[75] Inventor: Jackie D. Murley, Big Spring, Tex.

[73] Assignee: Co-Exx Pipe Company, Inc., Big Spring, Tex.

[21] Appl. No.: 515,296

[22] Filed: Jul. 19, 1983

[51] Int. Cl.³ .............................................. B29F 1/00
[52] U.S. Cl. .................................... 425/404; 264/237; 264/328.14; 425/547
[58] Field of Search ..................... 264/69, 237, 328.14, 264/336, 348; 425/403.1, 404, 445, 456, 547; 165/120, DIG. 11; 198/771; 406/75

[56] References Cited  
U.S. PATENT DOCUMENTS  
2,465,454 3/1949 Holt ..................................... 198/771  
3,425,237 2/1969 McLeese ............................. 165/120  
4,246,917 1/1981 Cafarelli ............................... 425/445

FOREIGN PATENT DOCUMENTS  
52-11584 1/1977 Japan ..................................... 406/75

Primary Examiner—Donald Czaja  
Assistant Examiner—V. Fischbach  
Attorney, Agent, or Firm—Crutsinger, Booth & Ross

[57] ABSTRACT

Apparatus for making injection molded polymeric articles, comprising a vibratory pneumatic cooling assembly adapted to dissipate thermal energy from the polymeric articles after they are ejected from the mold cavities through use of an oscillating perforated vibratory grid adapted to maintain the articles in relative motion while at least partially supporting them on a substantially uniform cushion of air. A method for employing the apparatus of the invention to substantially reduce the cycle time required for injection molding polymeric articles is also provided.

25 Claims, 6 Drawing Figures

APPARATUS FOR INJECTION MOLDING POLYMERIC ARTICLES

TECHNICAL FIELD

This invention relates to a significant and unexpected advance in the art of producing injection molded articles from thermoplastic or thermosetting polymers. Use of the apparatus and method disclosed herein will materially shorten the molding cycle required by conventional injection molding machines, thereby increasing their throughput rate and productivity.

BACKGROUND ART

Injection molding has long been used for manufacturing articles from thermoplastic and thermosetting polymeric resins. Small articles having relatively complex or detailed geometry are particularly well suited for manufacture by injection molding. Such articles can include, for example, polymeric bottle caps, cutlery, blow molding preforms, cottage cheese tubs; and other articles that are similarly suited to manufacture by a redundant injection molding operation. In a conventional injection molding process, a polymeric molding powder is introduced into the heating chamber of the machine, where it is plasticized. The plasticized polymer is then injected into the mold cavity. The rheological properties of the polymer must be such that it will flow readily through the sprue and mold gate and fill the mold uniformly. The injected polymer is maintained inside the mold under high pressure until it is sufficiently cooled, whereupon the mold is opened and the finished article is ejected.

The productivity that can be achieved in a repetitive molding operation is directly related to the time required to complete one cycle of operation. The overall time required for one operating cycle will necessarily depend upon a variety of factors including, for example, the composition and physical properties of the resin, molding temperature, mold geometry, and the like. Generally speaking, however, the time required to cool the injected polymer prior to ejecting the molded article from the mold comprises a major portion of the overall cycle. The mold is typically cooled by circulating fluid through a network of internal channels. When polymer is injected into the mold, that portion of the polymer which contacts the mold is cooled first, thereby forming a skin on the surface of the molded article. A temperature gradient is established which extends outwardly from the relatively hotter core of the article toward the relatively cooler skin at or near the walls of the mold cavity. Cooling is continued within the cavity until such time as sufficient heat has been dissipated from the molded articles that they will not deform or stick together upon being ejected from the mold.

Particular problems have been encountered in injection molding olefinic resins. Such resins tend to shrink away from the mold surface during cooling. Because the mold cavities are necessarily vented, air fills the space between the mold walls and the molded articles and forms an insulating barrier that hinders cooling and further lengthens the required cooling time.

The extent of cooling that is required prior to ejecting articles from the mold therefore depends not only upon the molding machine design, composition and physical properties of the polymeric resin, the weight and geometry of the molded articles and the like, but also upon the apparatus and methods by which they are handled upon being ejected from the mold. When the molded articles are initially ejected from the injection mold, the outer skin is desirably thick enough to resist deformation as they fall from the mold into a collecting bin, onto a conveyor, or the like. Once the molded articles are no longer in thermal contact with the cooled mold surface, the thermal energy at the core continues to migrate toward the relatively cooler skin, and if heat is not dissipated from this skin at a rate that is at least as great as the rate of migration from the core, the skin will begin to soften, making the article more susceptible to deformation and sticking. This effect is particularly significant when molding polymeric articles having walls with relatively thick cross sections.

With conventional injection molding equipment, the molded articles must be retained in the mold until sufficient thermal energy has been dissipated through the surfaces adjacent to the chilled mold walls that the surfaces will not be softened to an undesirable extent by the additional thermal energy which migrates to the surface after ejection. Even where the skin is not heated sufficiently to cause major deformation, it may become tacky or sticky, causing adjacent parts to stick or clump together during handling and storage. The foregoing problems have previously been avoided by extending the cooling portion of the injection molding cycle, thereby increasing cycle time and decreasing productivity.

In recent years, robots have been used by some for removing molded articles from the mold cavities of injection molding machines. However, such robots are expensive to build and maintain, and their use still does not permit the cycle time to be reduced to the extent desired.

An apparatus and method are therefore needed that will permit injection molded polymeric articles to be ejected from the mold cavity sooner than is now possible, and that will permit the molded articles to be transported and further cooled without risk of deformation or sticking.

SUMMARY OF THE INVENTION

I have discovered that through use of the apparatus and method disclosed herein, thermal energy can be more rapidly dissipated from injection molded polymeric articles than was previously achievable by conventional means and methods. Because of this, the molded articles do not need to be cooled for so long inside the mold cavity, and can be ejected from the mold with a higher core temperature and handled without sticking or deformation in a manner that was not heretofore possible. This in turn permits the cooling cycle of the injection molding operation to be shortened, thereby increasing throughput and productivity. These desirable results are surprisingly achieved by rapidly moving the molded thermoplastic articles ejected from an injection molding machine onto a vibratory grid by means of a pneumatic transport assembly and thereafter moving them longitudinally along the perforated web of an oscillating vibratory grid in such manner that each article is maintained in motion relative to any surrounding articles and is at least partially supported on an underlying, substantially uniform air cushion. The uniformity of this air cushion is believed to be the combined result of a distributed air flow upward through the perforated web of the oscillating vibratory grid and the confining effect of the side walls disposed adjacent to the vibratory grid.

According to the present invention, an apparatus and method are provided that will enable those of ordinary skill in the art to significantly reduce injection molding cycle time and to handle and transport injection molded articles to storage without deformation or sticking. According to a preferred embodiment of the invention, an injection molding apparatus is provided that comprises in combination a modified injection molding machine, a pneumatic transport assembly and a vibratory pneumatic cooling assembly.

According to another embodiment of the invention, the injection molding machine of the inventive combination is preferably adapted to actuate the pneumatic transport assembly as the mold closes, thereby causing the pneumatic transport assembly to propel the molded polymeric articles ejected from the mold onto the vibratory pneumatic cooling assembly.

According to another embodiment of the invention, a vibratory pneumatic cooling assembly is provided that is adapted to minimize prolonged contact between adjacent molded polymeric articles while simultaneously dissipating thermal energy from them so as to prevent deformation or sticking. The vibratory pneumatic cooling assembly preferably further comprises a perforated grid that is adapted to oscillate while air is forced through the perforations to simultaneously cool and provide support to the molded polymeric articles being transported across the grid. A substantially uniform pneumatic cushion is desirably formed by the oscillatory motion of the perforated grid in combination with a pressure balancing plenum disposed beneath the grid and upwardly extending side walls which are preferably outwardly adjustable so as to control the depth of the pneumatic cushion.

According to another embodiment of the invention, a method is provided for significantly reducing the cycle time required to produce injection molded polymeric articles. The cooling portion of the molding cycle is significantly shortened by employing a modified injection molding machine in combination with a pneumatic transport assembly adapted to propel the molded articles ejected from the molding machine onto a vibratory pneumatic cooling assembly that is adapted to maintain the articles in motion relative to each other and to the apparatus while simultaneously cooling them with an oscillating distributed air flow.

BRIEF DESCRIPTION OF THE DRAWINGS

The apparatus of the invention is further described and explained in relation to the following drawings wherein.

Like numerals are used to designate like parts in all figures of the drawings.

DETAILED DESCRIPTION OF A PREFERRED EMBODIMENT

Figure 1:
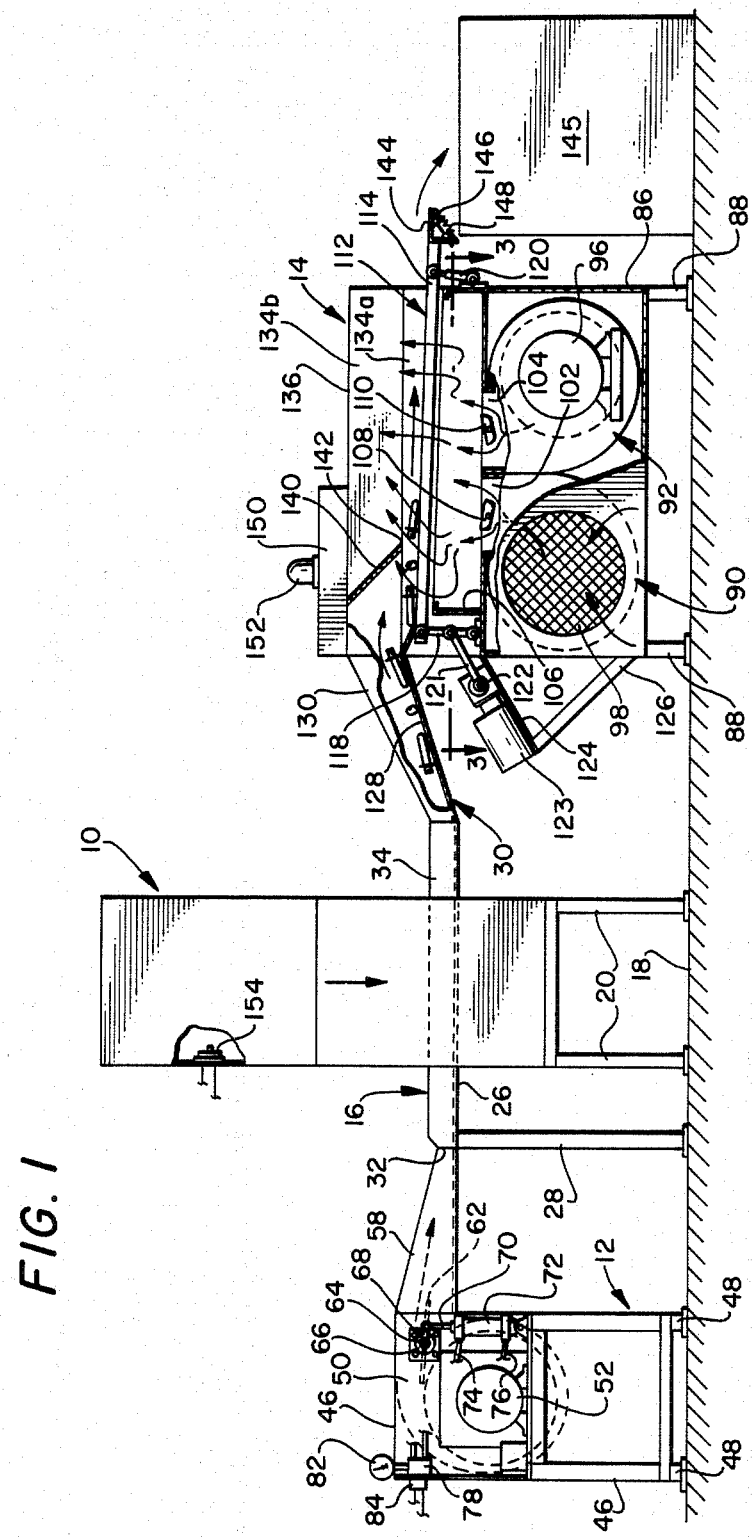
FIG. 1 is a front elevation view, partially broken away, of a preferred embodiment of the apparatus of the invention.
Figure 2:
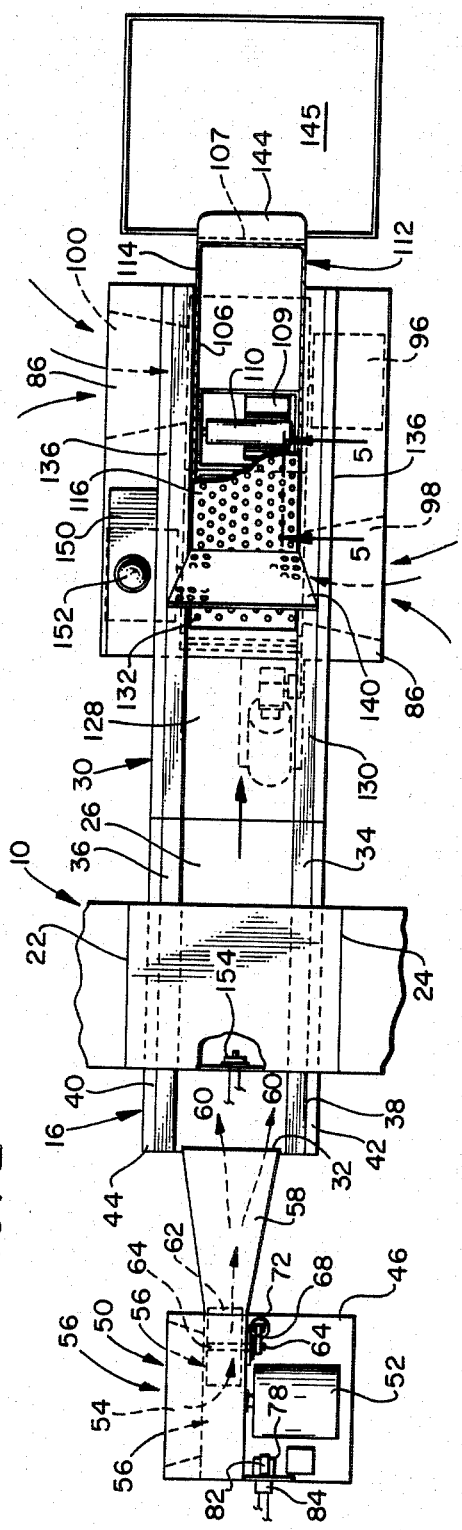
FIG. 2 is a plan view, partially broken away, of the apparatus shown in FIG. 1.

Referring to FIG. 1, the improved injection molding apparatus of the invention preferably comprises injection molding machine 10, pneumatic transport assembly 12 and vibratory pneumatic cooling assembly 14. Injection molding machine 10 is preferably selected from any of the many conventional, commercially available injection molding machines that are adapted to simultaneously mold a plurality of articles from a polymeric resin, provided, however, that such machine is preferably modified by the addition of a sensing means such as proximity switch 154, for reasons which are hereinafter discussed and described in further detail. As shown in FIGS. 1 and 2, injection molding machine 10 is supported above floor 18 by legs 20 and is disposed transversely to pneumatic transport assembly 12 and vibratory pneumatic cooling assembly 14. For ease of illustration and description, injection molding machine 10 is depicted in FIGS. 1 and 2 in a form that is greatly simplified. However, it is understood that the portion of injection molding machine 10 which comprises the molding heads preferably occupies the space between lines 22, 24 and is disposed above receiving tray 16.

Receiving tray 16 preferably extends transversely through injection molding machine 10 beneath the molding heads, and is adapted to receive the molded polymeric articles that are ejected from the mold. Receiving tray 16 can be an integral part of injection molding machine 10, or can be separately added, as desired. As shown in FIGS. 1 and 2, receiving tray 16 preferably further comprises a substantially horizontal, elongated rectangular bottom 26 which is supported at one end by legs 28 and at the other end by receiving ramp 30 of vibratory pneumatic cooling assembly 14. Bottom 26 of receiving tray 16 is preferably disposed in cooperating alignment with outlet 32 of pneumatic transport assembly 12 and with receiving ramp 30 of vibratory pneumatic cooling assembly 14. The longitudinal edges of bottom 26 are preferably bounded by upwardly extending side walls 34, 36, which maintain polymeric articles ejected from injection molding machine 10 within receiving tray 16 until they are propelled onto vibratory pneumatic cooling assembly 14. As shown in FIG. 2, the upwardly extending edges of side walls 34, 36 are folded along lines 38, 40, respectively, to form substantially horizontal edge members 42, 44.

Pneumatic transport assembly 12 preferably comprises cabinet 46 further comprising top, bottom, and side walls supported by legs 48 above floor 18. Sweep blower 50 is disposed within cabinet 46 and is rotatably driven by motor 52. Sweep blower 50 is preferably adapted so that motor 52 runs continuously during operation of injection molding machine 10, with the flow of air through outlet 32 of shroud 58 being separately controlled in accordance with the method of the invention. Referring to FIG. 2, air is drawn into intake 54 of sweep blower 50 as depicted by arrows 56 and is exhausted through outlet 32 of outlet shroud 58 into receiving tray 16 as shown by arrows 60. Air entering intake 54 is preferably filtered, particularly where the molded articles are intended for food grade applications. The flow of air out of sweep blower 50 is controlled by damper 62 connected to shaft 64, which is in turn rotatably mounted in bearing block 66. Link 68 pivotally connects shaft 64 of damper 62 to extension rod 70 of pneumatic cylinder 72. The position of extension rod 70 is pneumatically controlled through lines 74, 76 connected to solenoid valve 78. Pneumatic pressure is preferably supplied to solenoid valve 78 from an external source and is monitored by a pressure gauge 82. The operation of solenoid valve 78 is electrically actuated by controller 84 as will be further described below in discussing the method of the invention.

Referring to FIGS. 1-4, vibratory pneumatic cooling assembly 14 comprises cabinet 86 supported by legs 88 above floor 18 and preferably comprises blowers 90, 92 disposed therein. Blowers 90, 92 are preferably rotatably driven by motors 94, 96 mounted adjacent thereto. Air entering intakes 98, 100 of blowers 90, 92 is exhausted through outlets 102, 104, respectively, into plenum 106. Air entering intakes 98, 100 is preferably filtered, particularly where the molded articles are intended for food grade applications. Plenum 106 is preferably an elongated enclosure having a rectangular transverse cross section. Plenum 106 comprises vertical end and side walls which are mounted in fixed relation to the top wall of cabinet 86 of vibratory pneumatic cooling assembly 14. The tops of the longitudinally extending side walls of plenum 106 are desirably slightly tapered in accordance with the downward slope of vibratory grid 112, as discussed below. Rotatably mounted baffles 108, 110 are adjustable so as to aid in more evenly distributing the flow of air from outlets 102, 104 throughout plenum 106.

Vibratory grid 112 is preferably disposed in substantially parallel relation to the top of plenum 106 and closely adjacent thereto, although vibratory grid 112 will preferably not touch plenum 106 as it oscillates above the plenum. Vibratory grid 112 preferably comprises an elongated rectangular frame portion 114 having perforated web portion 116 disposed therein. Frame portion 114 is supported above plenum 106 by a plurality of pivotally connected links 118, 120 which are in turn pivotally connected to cabinet 86 of vibratory pneumatic cooling assembly 14. According to a particularly preferred embodiment of the invention, vibratory grid 112 is supported by links 118, 120 disposed on each side of frame portion 114 in order to provide increased support and to maintain vibratory grid 112 in its preferred alignment over plenum 106. Links 120 are preferably adjustable and are sufficiently shorter than links 118 that vibratory grid 112 will have a downward slope of about one inch per about four feet of length as it extends from links 118 to links 120. Vibratory control arm 121 is pivotally connected to link 118 and also pivotally connected to eccentrically mounted output shaft 122 of vibratory motor 123. When connected in this manner, vibratory control arm 121 causes vibratory grid 112 to oscillate in a substantially horizontal plane as the output shaft of motor 123 rotates. Motor 123 is preferably maintained in fixed relation to cabinet 86 of vibratory pneumatic cooling assembly 14 and is connected thereto by means of plate 124 and brace 126.

Vibratory pneumatic cooling assembly 14 preferably further comprises receiving ramp 30, which is disposed in abutting relation to the end of receiving tray 16. Receiving ramp 30 comprises a bottom portion 128 and upwardly extending side walls 130 adapted to direct molded polymeric articles onto vibratory grid 112 of vibratory pneumatic cooling assembly 14 when they are propelled out of receiving tray 16 by pneumatic transport assembly 12. The polymeric articles are thereafter moved longitudinally along web 116 of vibratory grid 112 in such manner that each article is maintained in motion relative to any surrounding articles and is at least partially supported on a substantially uniform air cushion. The uniformity of this air cushion is believed to result from the combined effects of the distributed air flow upward through plenum 106 and web 116 of vibratory grid 112 as it is oscillated by the motion of vibratory control arm 121. Motor 123 and vibratory control arm 121 are preferably adapted to oscillate vibratory gird 112 at an amplitude of about ½ to about 1 inch and at a frequency ranging between about 50 and 500 cycles per minute, and most preferably, between about 100 and 300 cycles per minute. It is understood, however, that both the amplitude and frequency of vibration can vary according to the size, weight and geometry of the molded articles.

Figure 5:
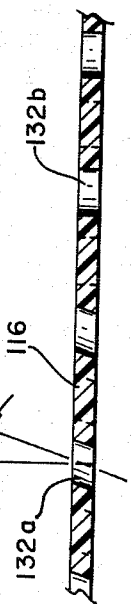
FIG. 5 is a sectional view of a portion of the perforated grid of the apparatus taken along line 5—5 of FIG. 2.
Figure 3:
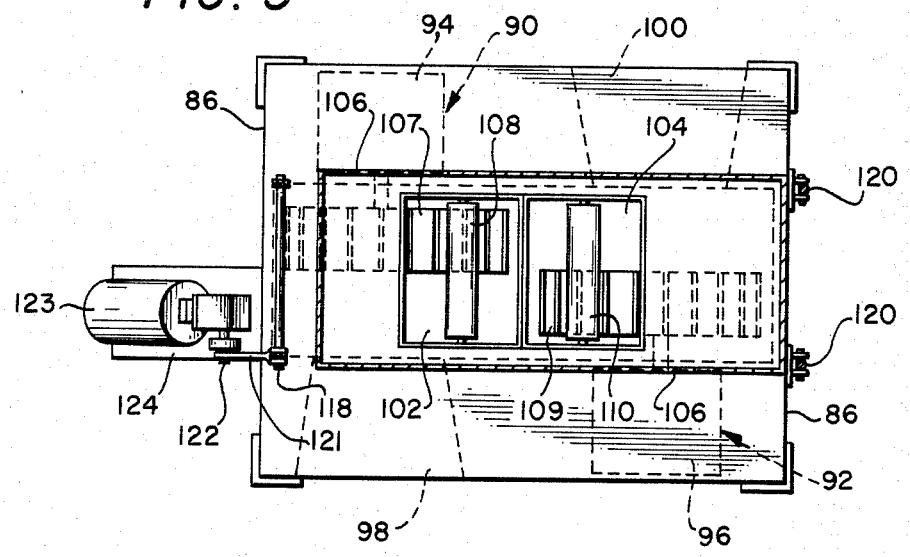
FIG. 3 is a sectional plan view taken along line 3—3 of FIG. 1.

The movement of polymeric articles along web 116 is also influenced by the diameter and spacing of perforations 132 in web 116, and the angle at which perforations 132 are drilled. Referring to FIGS. 2 and 5, perforations 132 are preferably aligned in rows, with the perforations in alternate rows being staggered to promote uniformity of the air flow. As shown in FIG. 5, perforations 132 are drilled vertically through web 116, and perforations 132a are drilled at an angle $\theta$ from the vertical that will impart a velocity component to air forced through perforations 132a in the desired direction of movement of the molded polymeric articles. Desirable results have been achieved by employing angled perforations 132a in about the first one third of web 116 and vertical perforations 132b in about the last two thirds of web 116. Although it is understood that the angle $\theta$ can vary within the scope of the invention, angles ranging from about 10° to about 25° are preferred. Particularly desirable results have been achieved when using an angle $\theta$ of about 15°. Angled perforations 132a in the first third of web 116 are believed to assist in preventing molded polymeric articles on vibratory grid 112 from being vibrated back down onto receiving ramp 30, and also to assist in moving the articles under crash barrier 140, as shown in FIGS. 1, 2 and 4.

Figure 4:
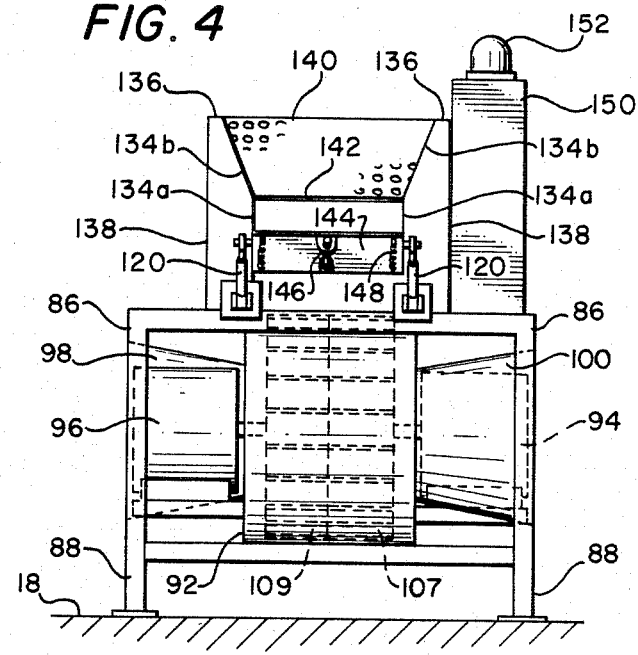
FIG. 4 is an end view taken along line 4—4 of FIG. 1.
Figure 6:
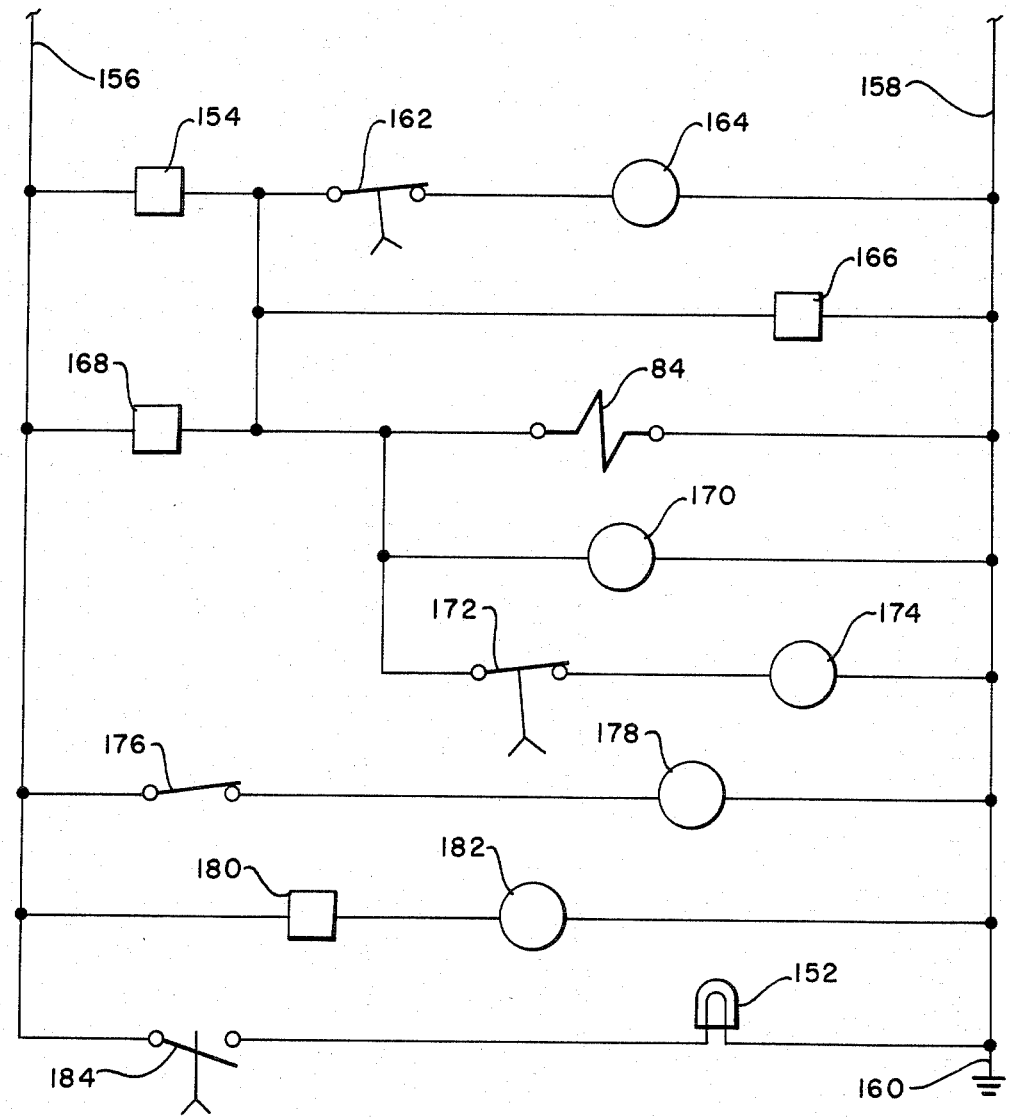

Referring to FIG. 4, the stability of the air cushion is believed to be further enhanced by the placement of side walls 134 closely adjacent to the longitudinal edges of vibratory grid 112 and extending generally upward therefrom. According to a preferred embodiment of the invention, side walls 134 further comprise a substantially vertical lower portion 134a and an outwardly flared upper portion 134b. The height of the vertically extending lower portion 134a can vary, but will preferably be approximately equal to one half the length of the injection molded polymeric articles to be handled by the apparatus. As shown in FIG. 4, side walls 134a, 134b are the interior walls of a double wall construction which further comprises top edges 136 and outside walls 138. Side walls of this type can be conveniently formed by folding sheet metal of the appropriate size and shape. This type of construction is particularly suited to applications where the apparatus will be employed in manufacturing products in which the overall weight and dimensions do not vary substantially. However, where the apparatus is intended for use with molded polymeric articles of varying weights and dimensions, it may be preferable to construct the side walls in such manner that the angular orientation of upper portions 134b relative to a vertical line extending upward through lower portions 134a can be adjusted. Generally speaking, the preferred height of vertical lower portions 134a increases and the extent to which upper portions 134b flare outwardly from the vertical decreases as the size and weight of the molded articles increases. Conversely, for smaller and lighter articles, the vertically extending lower side wall portions 134a should generally be shorter and the degree to which upper portions 134b are outwardly flared should be greater. When the vertically extending lower portions 134a are higher and upper portions 134b are more vertically oriented, the mass of air propelled upward through vibratory grid 112 by blowers 90, 92 remains more confined, thereby increasing the depth of the supportive air cushion and the pressure exerted by the air on the surface of the injection molded articles. Where the molded articles are intended for food-grade applications, the inwardly directed surfaces of side wall portions 134a, b can be covered with a suitable material such as polymeric sheeting, aluminum, stainless steel, or the like.

Crash barrier 140 is preferably transversely disposed between upper side wall portions 134b to insure that injection molded articles transported up receiving ramp 30 by pneumatic transport assembly 12 are deflected downward onto vibratory grid 112. To promote this function, the upper portion of crash barrier 140 is desirably inclined back toward receiving ramp 30. Crash barrier 140 is preferably constructed of a flexible elastomeric material adapted to absorb most of the kinetic energy of the injection molded articles as they are propelled into it by pneumatic transport assembly 12. Lower edge 142 of crash barrier 140 preferably extends sufficiently downward that the molded articles can only pass beneath it in a single layer as they move along vibratory grid 112.

According to FIGS. 1, 2 and 4, vibratory pneumatic cooling assembly 14 preferably further comprises an adjustable trim tab 144 which is mounted on the distal end of frame portion 114. Trim tab 144 can be maintained in a plane that is substantially parallel to the top surface of web 116 or, if desired, can be upwardly inclined relative to web 116 by pivoting trim tab 144 upwardly about hinge 147. The inclination of trim tab 144 is preferably controlled by adjustable bolt 146, and retainer springs 148 are preferably provided to stabilize the laterally extending end portions thereof. When in a slightly inclined position relative to the top surface of web 116, trib tab 144 operates as a dam and increases the residence time of the molded polymeric articles on vibratory grid 112 of vibratory pneumatic cooling assembly 14.

Control panel 150 having alarm light 152 disposed thereon is preferably mounted on one side of vibratory pneumatic cooling assembly 14 so that the operator can conveniently make any needed adjustments while observing the operation of the apparatus. The controls that are desirably disposed in control panel 150 are further described in relation to the method of the invention. Control panel 150 preferably comprises switches for actuating blower motors 52, 90, 92 and vibratory motor 123. These motors are preferably actuated at all times when injection molding machine 10 is in operation. Vibratory motor 123 is preferably provided with an adjustable control that will permit the operator to control the rotation of shaft 122, thereby controlling the frequency of vibration of vibratory grid 112. Other controls can include, for example, a timer, delay switch, and manual override for damper 62 of sweep blower 50 and a counter/alarm that is preset to warn the operator when storage receptacle 145 is full.

Injection molding machine 10 is preferably provided with a sensing device 154 which is adapted to trigger relay 84 of solenoid valve 78 within pneumatic transport assembly 12 whenever molded polymeric articles have been ejected from the mold cavities within injection molding machine 10 onto receiving tray 16. According to a particularly preferred embodiment of the invention, sensing device 154 comprises a proximity switch that is triggered whenever the molding heads of injection molding machine 10 are returning into sealing engagement with each other after ejecting each group of molded polymeric articles. Solenoid valve 78 preferably supplies pneumatic pressure to pneumatic cylinder 72 through control lines 74, 76, as previously discussed. The pressure in control lines 74, 76 is monitored by pressure gauge 82. The pressure in pneumatic control lines 74, 76 is also desirably monitored at control panel 150, and an alarm can be provided to warn the operator of a loss of pneumatic pressure in pneumatic transport assembly 12.

According to the method of the invention, whenever sensing device 154 is triggered, solenoid valve 78 and pneumatic cylinder 72 are actuated to rotate damper 62 to the open position. This permits air to be discharged by sweep blower 50 through outlet 32 of shroud 58 as shown by arrows 60 in FIG. 2. In this manner, pneumatic transport assembly 12 is actuated almost immediately following the time that the molded polymeric articles are ejected onto receiving tray 16. Sweep blower 50 and motor 52 are preferably designed with backwardly inclined airfoil blades so that they can be operated without damage when damper 62 is in the closed position. The use of a damper 62 to control the flow of air from sweep blower 50 enables pneumatic transport assembly 12 to be actuated more quickly than if motor 52 is started and stopped each time that another group of molded polymeric articles is ejected from the mold cavities of injection molding machine 10. According to an alternate embodiment of the invention, sweep blower 50 of pneumatic transport assembly 12 is permitted to continuously discharge air through outlet 32 whenever injection molding machine 10 is in operation. However, the air discharged by sweep blower 52 may contain moisture which could condense on the walls of the mold cavities while they are in the open position, and for this reason the use of damper 62 is preferred. Because sensing device 154 is triggered while the molding heads are closing after the molded polymeric articles have been ejected from the mold cavities, the molding heads will have returned into sealing engagement with each other before air is released by damper 62 through outlet 32 into receiving tray 16. Of course, it will be understood and appreciated by those of ordinary skill in the art that a sensing device that is adapted to be triggered when the molds open or when the molded polymeric articles are ejected from the mold cavities will be similarly effective if employed with a time delay in the circuit between sensing device 154 and solenoid relay 84 so that the molding heads are permitted to close before damper 62 is rotated to the open position.

Once damper 62 is in the open position, the air discharged through outlet 32 of pneumatic transport assembly 12 is desirably sufficient to propel molded polymeric articles resting on bottom 26 of receiving tray 16 up receiving ramp 30 of vibratory pneumatic cooling assembly 14 and onto vibratory grid 112. This should preferably occur within about two seconds after the partially cooled articles are ejected from the mold cavities to prevent sticking. As previously mentioned, crash barrier 104 is provided to downwardly deflect any molded polymeric articles that are propelled upwardly by the air from pneumatic transport assembly 12. Control means is preferably provided in control panel 150 for adustably regulating the length of time that solenoid relay 84 is permitted to maintain solenoid valve 78 in the open position. The cycle of operation of solenoid valve 78 is preferably adjusted so that damper 62 will be returned to its closed position prior to the time that the molding heads within injection molding machine 10 are again opened to eject the next group of molded polymeric articles.

Once the molded polymeric articles reach vibratory grid 112, they are maintained in continuous motion relative to each other and to the grid by the vibratory motion imparted by motor 123. Simultaneously, the molded polymeric articles are subjected to a substantially uniform flow of air passing upward through apertures 132a, 132b. As previously discussed, upwardly extending side walls 134a cooperate to confine the air flowing upward through apertures 132a, 132b above vibratory grid 112 so as to form a cushion upon which the molded polymeric articles are partially supported as they are directed longitudinally along vibratory grid 112, over trim tab 144, and into storage receptacle 145. The uniformity of the air cushion thus formed above vibratory grid 112 is believed to be enhanced by the oscillating motion of the grid. Without this vibratory motion, air would flow upward through apertures 132a, 132b in discrete jets having "dead spots" disposed therebetween. These dead spots are believed to be effectively eliminated by oscillating vibratory grid 112 in the manner disclosed herein.

The extent to which molded polymeric articles are supported by the air cushion above vibratory grid 112 will vary according to the size and shape of the articles, the pressure exerted by blowers 90, 92, the geometry of side walls 134, and the amplitude of vibration of vibratory grid 112. The residence time of molded polymeric articles on vibratory grid 112 will also vary according to the vibrational frequency and amplitude, as well as the angle of inclination of vibratory grid 112, the force exerted by the air flowing upward through apertures 132a, 132b, and the angle $\theta$ at which apertures 132a are forwardly inclined from the vertical. Trim tab 144 can also be inclined upwardly relative to the plane of web 116 as previously described to increase the residence time of the molded polymeric articles on the vibrating grid. Although trim tab 144 is depicted in the drawings as being manually adjustable, it will be understood and appreciated that it can also be adapted to be controlled either electrically or pneumatically from control panel 150 if desired.

The significant improvements achieved through use of the apparatus and method disclosed herein are further illustrated by the examples set forth below:

EXAMPLE 1

Preforms for two liter carbonated beverage bottles were first produced by utilizing a conventional injection molding machine having 16 mold cavities into which polyethylene terephthalate resin was injected at a pressure of about 25,000 psi and a temperature of about 450° F. The injection molding machine was operated on a cycle ranging from about 34 to about 37 seconds. Of this time, approximately eight seconds were required to cycle the mold and to inject the resin into the mold cavities. The remainder of the time, from about 26 to about 29 seconds, was required to cool the molded preforms prior to ejecting them from the mold. After ejection, the preforms were transported onto a paddle wheel conveyor from which they were then discharged into a storage container. Attempts to shorten the cooling cycle of the injection molding machine while employing this apparatus were unsuccessful. Whenever the cycle time was reduced below 34 seconds, the preforms ejected from the mold cavities tended to stick together and to deform under the weight of the surrounding preforms in the storage receptacle because they were not sufficiently cooled. Although the skin formed on the preforms inside the mold cavities was sufficient to withstand deformation upon ejection from the mold, the apparatus and method for handling the preforms outside the mold were inadequate for dissipating the thermal energy which thereafter migrated from the central core to the surface of the preforms. Thus, once they were in the storage receptacle, the surface of the preforms began to soften, causing sticking and deformation.

EXAMPLE 2

The apparatus of the invention was thereafter installed on the same injection molding machine, which continued to mold preforms for carbonated beverage bottles using polyethylene terephthalate resin. The apparatus of the invention employed one five horsepower blower as sweep blower 50 and two five horsepower blowers as blowers 90, 92 of the invention. The subject blowers were designed by Chicago Blower Corporation and were designed to deliver from about 2500 to about 3500 cubic feet of air per minute with a 12 and one-fourth inch diameter fan under a static pressure ranging from about six inches to about two inches, respectively. In vibratory pneumatic cooling assembly 14, the air was delivered through a vibratory grid comprising a web 116 made of a plastic sheet material having a thickness of about 0.200 inches. The apertures 132 had a diameter of about one-half inch and were alternately staggered along rows having a centerline spacing of about three-quarters inch. Web 116 was approximately 42 inches long and 10 inches wide between side walls 134a. Apertures 132a were drilled at an angle of about 15° from the vertical for the first third of web 116 and were drilled vertically through web 116 thereafter. Links 118 and 120 were adjusted so as to provide a drop of about one inch over the length of vibratory grid 112, and vibratory motor 123 was controlled so as to oscillate vibratory grid 112 at a frequency of about 120 cycles per minute. Pneumatic transport assembly 12 was actuated by a proximity switch as previously described, which was triggered by the mold portions as they moved back into sealing engagement with each other after ejecting the preforms from the mold cavities. Solenoid relay 84 actuated solenoid valve 78 in such manner that the preforms ejected from the ejection molding machine were propelled onto the vibratory pneumatic cooling assembly 14 almost instantaneously after falling onto receiving tray 16. Trim tab 144 of vibratory grid was maintained in a slightly inclined relation to web 116.

The molding cycle of the injection molding machine was thereafter reduced incrementally, and the preforms discharged from the distal end of vibratory pneumatic cooling assembly 14 were inspected to determine whether softening, sticking or deformation would occur. Through use of the method and apparatus disclosed herein, it was discovered that the overall cycle time could be reduced to about 24 seconds, compared to the range of about 34 to about 37 seconds previously required through use of the conventional methods and apparatus as described in Example 1. Thus, it is seen that significant increases in productivity are attainable through use of the inventive apparatus and method without detrimentally affecting product quality.

According to a preferred embodiment of the invention, pneumatic transport assembly 12 and vibratory pneumatic cooling assembly 14 are desirably constructed from metallic sheet material. Where the molded polymeric articles are intended to be of food-grade, it is understood that the surfaces and contact with those materials will desirably be constructed of stainless steel, aluminized steel, aluminum, plastic, or some other similarly acceptable material, provided however that such parts are designed to have the necessary strength and rigidity. Although pneumatic transport assembly 12 and vibratory pneumatic cooling assembly 14 are shown in the accompanying drawings as having legs 48 that remain stationary with respect to supporting surface 18, it will be apparent that locking casters, jack-up casters and the like can also be utilized to provide greater mobility of the apparatus where desired.

It is believed that the subject apparatus and method can be successfully employed for use with injection molded polymeric articles comprising either thermoplastic or thermosetting resins injected at temperatures ranging from about 300° up to about 700° F., although it is understood that the cycle times in each case will vary according to the resin, the cooling capability of the mold, the wall thickness of the molded polymeric articles, and the like. The subject apparatus and method are particularly effective when molding resins which tend to shrink away from the mold walls, thereby further reducing the effectiveness of cooling inside the mold and emphasizing the importance of subsequent handling and cooling.

While vibratory pneumatic cooling assembly is disclosed herein as employing ambient air, it may be preferable in some applications to control the temperature and/or the humidity of the air or other gaseous cooling medium passing through blowers 90, 92 and to recapture the spent gas by means such as a hood disposed over the apparatus for recirculation through the system.

The use of a rotatable pneumatic cooling assembly comprising a plurality of compartments adapted to sequentially receive and cool molded polymeric articles can likewise be employed for further increasing the efficiency of the invention for some applications.

Pneumatic transport assembly 12 can be further adapted through the use of appropriate ducts, hoses, valves, and the like to sequentially direct the cooled articles to alternate storage receptacles or to other equipment for further processing if desired. Similarly, other alterations and modifications of the invention will become apparent to those of ordinary skill in the art upon reading the present disclosure, and it is intended to cover all such modifications as fall within the scope of the appended claims.

What is claimed is:

1. Apparatus for making injection molded polymeric articles, said apparatus comprising:
    a. An injection molding machine adapted to repetitively mold like articles from a polymeric resin, said machine further comprising at least one mold cavity, means for injecting a polymeric resin into each said mold cavity to form a molded polymeric article; means for partially cooling each said molded polymeric article within said mold cavity, and means for ejecting each said partially cooled molded polymeric article from each said mold cavity;
    b. Receiving means adapted to receive said molded polymeric article after being ejected from said mold cavity;
    c. Vibratory pneumatic cooling means adapted to further dissipate thermal energy from each said partially cooled molded polymeric article, said vibratory pneumatic cooling means further comprising a perforated vibratory grid, means for oscillating said perforated vibratory grid, means for directing a gaseous fluid upwardly through the perforations in said perforated vibratory grid, and side walls extending longitudinally along the sides of said perforated vibratory grid and upwardly therefrom;
    d. Pneumatic transport means adapted to pneumatically propel each molded polymeric article from said receiving means onto said vibratory pneumatic cooling means, said pneumatic transport means further comprising a sweep blower adapted to discharge a flow of gaseous fluid across said receiving means at a pressure sufficient to propel each molded polymeric article disposed in said receiving means onto said vibratory pneumatic cooling means; and
    e. Means for actuating said pneumatic transport means after each molded polymeric article is ejected from said mold cavity onto said receiving means so that said molded polymeric article is thereafter propelled onto said vibratory pneumatic cooling assembly from said receiving means.

2. The apparatus of claim 1 wherein the perforated vibratory grid of said vibratory pneumatic cooling means is adapted to oscillate in a substantially horizontal plane at a frequency ranging from about 50 to about 500 cycles per minute.

3. The apparatus of claim 2 wherein said perforated vibratory grid is adapted to oscillate at a frequency ranging between about 100 and about 300 cycles per minute.

4. The apparatus of claim 1 wherein said vibratory pneumatic cooling means further comprises at least one blower means adapted to discharge a gaseous fluid under pressure, and a plenum adapted to deliver a substantially balanced flow of said fluid from said blower means to said perforated vibratory grid.

5. The apparatus of claim 1 wherein said vibratory pneumatic cooling means further comprises a crash barrier adapted to deflect a molded polymeric article pneumatically propelled from said receiving means by said pneumatic transport means downwardly onto said vibratory grid.

6. The apparatus of claim 1 wherein said perforated vibratory grid comprises a plurality of closely spaced perforations, said perforations being aligned in rows, with the perforations in alternate rows being staggered to promote a substantially uniform flow of the gaseous fluid upwardly through said perforated vibratory grid.

7. The apparatus of claim 6 wherein at least a portion of the perforations in said perforated vibratory grid are drilled at an angle $\theta$ from the vertical in the desired direction of movement of the molded polymeric articles along said perforated vibratory grid.

8. The apparatus of claim 7 wherein said angle θ ranges between about 10 and about 25 degrees.

9. The apparatus of claim 8 wherein the angle θ is about 15 degrees.

10. The apparatus of claim 1 wherein said vibratory grid is downwardly sloped in a desired direction of travel of each molded polymeric article.

11. The apparatus of claim 1 wherein the side walls of said vibratory pneumatic cooling means further comprise a substantially vertical lower portion and an outwardly flared upper portion.

12. The apparatus of claim 1 wherein said vibratory pneumatic cooling means further comprises an angularly adjustable trim tab pivotally connected to the distal end of said perforated vibratory grid, said trim tab being adapted to be inclined relative to the plane of said perforated vibratory grid so as to increase the residence time of each molded polymeric article on said vibratory pneumatic cooling means.

13. The apparatus of claim 1 wherein said pneumatic transport means further comprises a damper adapted to control the flow of gaseous fluid discharged by said sweep blower.

14. Apparatus for transporting and cooling molded polymeric articles upon discharge from a molding machine, said apparatus comprising:

A vibratory pneumatic cooling means adapted to dissipate thermal energy from said articles, said vibratory pneumatic cooling means further comprising a perforated vibratory grid, means for oscillating said perforated vibratory grid in a substantially horizontal plane, means for directing a gaseous fluid upwardly through the perforations in said perforated vibratory grid, and side walls extending longitudinally along the sides of said perforated vibratory grid and upwardly therefrom; and Pneumatic transport means adapted to pneumatically propel said molded polymeric articles onto said vibrating pneumatic cooling means as soon as said molded polymeric articles are discharged from said molding machine, said pneumatic transport means further comprising a sweep blower adapted to discharge a flow of gaseous fluid at a pressure sufficient to propel molded polymeric articles discharged from said molding machine onto said vibratory pneumatic cooling means.

15. The apparatus of claim 14 wherein the perforated vibratory grid of said vibratory pneumatic cooling means is adapted to oscillate in a substantially horizontal plane at a frequency ranging from about 50 to about 500 cycles per minute.

16. The apparatus of claim 15 wherein said perforated vibratory grid is adapted to oscillate at a frequency ranging between about 100 and about 300 cycles per minute.

17. The apparatus of claim 14 wherein said vibratory pneumatic cooling means further comprises at least one blower means adapted to discharge a gaseous fluid under pressure, and a plenum adapted to deliver a substantially balanced flow of said fluid from said blower means to said perforated vibratory grid.

18. The apparatus of claim 14 wherein said vibratory pneumatic cooling means further comprises a crash barrier adapted to deflect molded polymeric articles pneumatically propelled by said pneumatic transport means downwardly onto said vibratory grid.

19. The apparatus of claim 14 wherein said perforated vibratory grid comprises a plurality of closely spaced perforations, said perforations being aligned in rows, with the perforations in alternate rows being staggered to promote a substantially uniform flow of the gaseous fluid upwardly through said perforated vibratory grid.

20. The apparatus of claim 19 wherein at least a portion of the perforations in said perforated vibratory grid are drilled at an angle θ from the vertical in the desired direction of movement of the molded polymeric articles along said perforated vibratory grid.

21. The apparatus of claim 20 wherein said angle θ ranges between about 10 and about 25 degrees.

22. The apparatus of claim 21 wherein the angle θ is about 15 degrees.

23. The apparatus of claim 14 wherein said vibratory grid is downwardly sloped in a desired direction of travel of each molded polymeric article.

24. The apparatus of claim 16 wherein the side walls of said vibratory pneumatic cooling means further comprise a substantially vertical lower portion and an outwardly flared upper portion.

25. The apparatus of claim 14 wherein said vibratory pneumatic cooling means further comprises an angularly adjustable trim tab pivotally connected to the distal end of said perforated vibratory grid, said trim tab being adapted to be inclined relative to the plane of said perforated vibratory grid so as to increase the residence time of each molded polymeric article on said vibratory pneumatic cooling means.

* * * * *

UNITED STATES PATENT AND TRADEMARK OFFICE
CERTIFICATE OF CORRECTION

PATENT NO. : 4,527,970

DATED : July 9, 1985

INVENTOR(S) : Jackie D. Murley

It is certified that error appears in the above-identified patent and that said Letters Patent is hereby corrected as shown below:

In Column 14, line 38, change "16" to -- 14 --.

Signed and Sealed this

Eighth Day of October 1985

[SEAL]

Attest:

Attesting Officer

DONALD J. QUIGG

Commissioner of Patents and
Trademarks—Designate